(12) United States Patent
Throckmorton

(10) Patent No.: X9140
(45) Date of Patent: Oct. 6, 1835

(54) PLANING MACHINE

(76) Inventor: Reid R. Throckmorton

Reid R Throckmorton
Letters Patent

The Schedule referred to in these Letters Patent and making
part of the same Containing a description in the words of the said
Reid R Throckmorton himself of his improvement in the Machine for
planing boards. Flooring and other Materials To all to whom these presents shall come Reid R Throckmorton of
the City and State of New York Sends Greeting. Be it known that
I the said Reid R Throckmorton have invented made and applied
to use a new and useful improvement in the mode of planing boards
floor plank and other materials by Machinery at one operation
by means of a plane called the Vibratory Eccentric plane specified
in the words following viz. This improvement in the first place Con
=sists of a frame of wood or iron of about 14 ft in length and 3 ft
in breadth standing on six legs about 3 ft high said frame to
have about 4 or 6 cross pieces or girths and otherwise sufficiently bra
=ced to make it firm and strong.
2d Across the frame are placed four or more rollers about five
inches diameter of hard wood or iron turned true two or more be
=neath and the same above the plank the under rollers having
pullies of about sixteen inches diameter or Cogg wheels attached
to one end and are revolved by means of belts or intermediate Cogg
wheels from a small pulley about six inches diameter or Cogg wheel
on feed shaft underneath the frame; the upper rollers are held down
by weights and levers and the gudgeons of which [illegible] move
=able boxes so as to admit of different thickness of board or plank
said frame has in the centre immediately beneath the plane a
bed plate of iron or hard wood or rollers to support the plank be
during the operation of the plane. On the feed shaft there is a
drum or Ratchet wheel with its [illegible] of a drum about fifteen inches diameter of a ratchett wheel about two feet six inches diameter; the drum to receive a belt from the first Mover — (which is a drum of about twenty inches diameter placed also beneath the frame and on the shaft of which is fixed a pulley of about twelve inches diameter) The mover to the ratchett wheel can be attached to the Crank shaft or to the plane itself whichever mode may be most convenient to give it the forward and backward motion. —

3[d] The plane is in form of a quadrant suspended on a shaft or axis — supported [+] in pillar blocks resting on gallows frames four feet high which said frames are firmly bolted on the frame of the machine and braced with a triangular brace — or otherwise.

4[th] The Plane (suspended by braces attached to eccentrics) is a seg- ment of a circle of about eight feet diameter and the length of said segment is about three feet, and of a width suited to the material to be operated upon. It has five or more plane irons or cutters attached to its periphery set in a slanting position so as to make a smooth and clean cut and firmly fastened with screw-keys and regulated [illegible] by screws. —

5[th] Motion is given to the plane by means of a shackle bar or Connec- ting rod attached to the centre of the length of said plane and about six or nine inches from its periphery said Connecting rod is attached by the other end to one of the arms of the Fly wheel of about two feet six inches diameter — the shaft of said fly wheel about three and a half feet in length and [illegible] in diameter 6[th] On the shaft or axis of plane are the small eccentrics of about nine inches diameter to which the braces of the plane are attached by means of straps and short eccentric rods. The lowering and rising of the plane to accommodate different thickness of material to be planed is obtained by means of screws connecting the plane braces and ec- centric rods 7[th] The crank fastened on the plane axis and extending downwards in a line with the centre of the plane about two feet and nine inches in length and attached to the connecting rod which at its other end works on an Eccentric about one foot diameter (and to be varied accor
=ding to length of Crank on plane axis) on fly wheel shaft.
8 The operation of the eccentrics on plane axis and on Fly wheel shaft
by means of the Crank and the Connecting rod give a Vibratory &
rectilineal motion to the plane by reason of which the plane in its
forward stroke cuts a part of its Course in a straight line and the
balance of the cut Circular
9th The side Cutters for grooving and tonguing in their ~~in their~~
Construction and mode of operation do not materially vary from
those long in use: or they may be made on principles analagous
to those of the plane above described
10th The Vibratory and rectilineal motion above mentioned may
be obtained by various other modes, viz by means of rack and pin
=ion - by Cams - by slides - by parallel motion now so common
=ly in use in Steam Engines by Sun and planet wheels, or by
dropping the rear end of the plane by means of screws in the rear
base of the same - but eccentrics as above described are judged pref
=erable -

The said Reid R Throckmorton claims particularly as
his invention the peculiar Construction of the plane and the na
=ture of its motion being Vibratory and Rectilineal & which mo
=tion is obtained by means of eccentrics on plane axis connected
by Crank and Shackle bar with eccentrics on Fly wheel shaft
In testimony that the above is a true Specification of my im
=provements I have hereunto set my hand the twenty fourth
day of May in the Year of our Lord one thousand Eight hun
=dred and thirty five Reid R Throckmorton Witnesses
James [illegible] }
John I [illegible] }

Ex.d
Ch. J.W.